United States Patent [19]

Bonin et al.

[11] Patent Number: 4,704,417

[45] Date of Patent: Nov. 3, 1987

[54] MIXED POLYESTER MOLDING COMPOSITIONS

[75] Inventors: Yves Bonin, Brignais; Michel Logeat, Serpaize, both of France

[73] Assignee: Rhone-Poulenc Specialites Chimiques, Courbevoie, France

[21] Appl. No.: 751,989

[22] Filed: Jul. 5, 1985

[30] Foreign Application Priority Data

Jul. 5, 1984 [FR] France ................................ 84 10904

[51] Int. Cl.$^4$ ............................................... C08K 5/52
[52] U.S. Cl. .................................... 524/140; 524/141; 524/145; 524/439
[58] Field of Search ................ 524/140, 141, 145, 539

[56] References Cited

U.S. PATENT DOCUMENTS 3,953,394 4/1976 Fox et al. ............................. 524/140
3,953,539 4/1976 Kawase et al. ...................... 528/127
4,123,420 10/1978 Kyo et al. ............................ 524/140

OTHER PUBLICATIONS

K. Thinuis, "Stabiliserung und Alterung von Plastwerkstoffen", vol. 1, 1969, Akademie Verlag, Berlin, DE; p. 516.

Primary Examiner—John Kight
Assistant Examiner—Kriellion S. Morgan
Attorney, Agent, or Firm—Burns, Doane, Swecker & Mathis

[57] ABSTRACT

Mixed polyester molding compositions comprising at least a pair of structurally different thermoplastic polyesters are stabilized against transesterification, whether during formulation or the downstream molding thereof, by having incorporated therein an effective amount of at least one mono-, di- or triester of orthophosphoric acid.

4 Claims, No Drawings

MIXED POLYESTER MOLDING COMPOSITIONS

BACKGROUND OF THE INVENTION

1. Field of the Invention

The present invention relates to polymeric molding compositions, especially to molding compositions comprising a pair of thermoplastic polyesters having different chemical structures. More particularly, this invention relates to polyester molding compositions in which the polyester constituents do not undergo a transesterification reaction to any significant degree when heated to the molding temperature.

2. Description of the Prior Art

To date, polyethylene terephthalate has been considered the most interesting of the thermoplastic polyesters from an industrial and commercial standpoint. However, polyethylene terephthalate, although readily available and having an advantageous price, has been accepted only to a limited extent as a molding resin for the manufacture or production of shaped articles. This restricted use may be principally due to the low degree of crystallization which is inherent in its structure, its tendency to undergo considerable shrinkage and thus resulting in distorted articles, and its tendency to form articles which are liable to change as a result of crystallization when reheated. The use of extended residence times in the mold to effect the required crystallization is of no industrial interest.

Certain polyalkylene terephthalates other than polyethylene terephthalate, such as poly-1,4-butylene terephthalate, have been used successfully as molding resins as a result of their specific ability to crystallize more rapidly than polyethylene terephthalate, which makes molding easier; demolding is greatly facilitated and cycle times are short.

However, poly-1,4-butylene terephthalate tends to be more costly than polyethylene terephthalate, which has in some measure restricted its development. Moreover, the resultant molded articles exhibit poor dimensional stability when hot as a result of the low glass transition temperature of this polyester (in the region of 40° C.). As a result, the remaining mechanical properties, in particular flexural modulus and strength, also leave something to be desired at elevated temperatures. In contrast, polyethylene terephthalate molding materials produce articles which have a satisfactory combination of mechanical properties because their Tg is in the region of 75° C.

Other attractive thermoplastic materials have appeared on the market; these are wholly aromatic polyesters resulting from the polycondensation of diphenols, such as, for example, bisphenol A, with aromatic dicarboxylic acids, such as, for example, terephthalic acid, isophthalic acid, or mixtures thereof. The change to a wholly aromatic structure results in an increase in the Tg in the region of 170° C.), which in turn results in better retention of mechanical properties at elevated temperatures by articles based on said wholly aromatic polyesters. The development of these molding materials is considerably retarded, however, by the fact that the wholly aromatic polyesters are difficult to mold, in comparison with polyethylene terephthalate and poly-1,4-butylene terephthalate. Thus, for example, in injection molding, a wholly aromatic polyester requires a high molding temperature of approximately 300° to 350° C., a high injection pressure of approximately 100 to 150 Mpa and a high mold temperature of approximately 120° to 150° C.; the molded articles then have faults such as shrink marks, flow marks and high internal stresses.

It too is known to this art that the various faults referred to above, which are inherent in the structures of polyethylene terephthalate, poly-1,4-butylene terephthalate or of a wholly aromatic polyester, can be completely or partially corrected by utilizing mixtures of these polymers. For example, the addition of poly-1,4-butylene terephthalate to polyethylene terephthalate (which is present in major amounts in the mixture) will provide an improved polyester composition capable of being molded using residence times in the mold which are practicable industrially (cf. particularly French patent application No. 74/31,228, published under No. 2,243,978). As another example, the addition of polyethylene terephthalate to poly-1,4-butylene terephthalate (which is present in major amounts in the mixture) will provide an improved polyester composition which, when molded, will provide articles having satisfactory thermal behavior (cf. again the aforesaid published French patent application). As still another example, the addition of polyethylene terephthalate to a wholly aromatic polyester (which is present in major amounts in the mixture) will provide a composition having very clearly improved moldability (cf. particularly French patent application No. 73/23,798, published under No. 2,190,873).

It is also known that, when two polyesters having different chemical structures are combined in the melt to produce a mixture, it is to be expected that the polyesters undergo a transesterification reaction on being heated, which can be discerned by the appearance of a copolymer, by a marked lowering in the melting point of at least one of the polyester components, and by a considerable reduction in the rate/degree of crystallization thereof. On being molded, the polyesters which are partially transesterified in this manner produce articles having less attractive mechanical properties than those produced from non-transesterified polyesters. Consequently, the use of mixtures of polyesters in which transesterification occurs is not particularly recommended, especially when a long residence time in the mold is considered to be important and when the production of good mechanical properties and their retention at high temperatures are deemed to be important. Cf. U.S. Pat. No. 4,123,420, published French patent applications Nos. 2,223,424 and 2,243,978, and German Offenlegungsschrift No. 27 49 261.

SUMMARY OF THE INVENTION

Accordingly, a major object of the present invention is the provision of improved mixed polyester molding compositions which essentially avoid transesterification between the polyesters during the preparation and the conversion of mixtures of polyesters having different chemical structures, by incorporating therein at least one phosphorus-based compound.

Briefly, the present invention features improved compositions intended particularly for molding, comprising a pair of, or at least two different thermoplastic polyesters having different structures, and further comprising an effective amount of at least one phosphorus-based compound substantially comprising an esterified orthophosphoric acid having one of the formulae (I), (II) or (III):

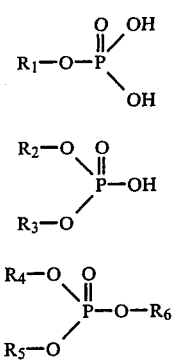

in which $R_1$, $R_2$ and $R_3$, which may be identical or different, are each a straight or branched chain alkyl radical containing from 1 to 8 carbon atoms; a phenyl radical optionally substituted by 1 to 3 alkyl radicals containing from 1 to 3 carbon atoms; a phenylalkyl radical containing from 1 to 3 carbon atoms in the alkyl moiety and the benzene nucleus of which can optionally be substituted by 1 to 3 alkyl radicals having from 1 to 3 carbon atoms, and $R_4$, $R_5$ and $R_6$, which also may be identical or different, are each a straight or branched chain alkyl radical containing from 1 to 4 carbon atoms which can itself be identical to or different from the alkyl radicals $R_1$, $R_2$ and $R_3$.

DETAILED DESCRIPTION OF THE INVENTION

More particularly according to the present invention, among the phosphorus-based compounds having the formulae (I), (II) and (III), the following are representative: dihydrogen mono-: methyl, ethyl, propyl, butyl, tert-butyl, pentyl, hexyl, phenyl, cresyl and benzyl phosphates; monohydrogen di-: methyl, ethyl, propyl, butyl, tert-butyl, pentyl, hexyl, phenyl, cresyl and benzyl phosphates; monohydrogen methyl ethyl, methyl propyl, ethyl propyl, ethyl butyl, methyl phenyl, and ethyl phenyl phosphates; and trimethyl, triethyl, tripropyl, tributyl, dimethyl ethyl, methyl propyl, dimethyl butyl, diethyl methyl and diethyl propyl phosphates.

The phosphorus-based compounds of the formulae (I), (II) and (III) are preferred in which the radicals $R_1$ to $R_6$ each denote a straight or branched chain alkyl radical, containing from 1 to 6 carbon atoms in the case of the radicals $R_1$ to $R_3$ and containing from 1 to 3 carbon atoms in the case of radicals $R_4$ to $R_6$.

It will be appreciated that it is within the ambit of this invention to use, in addition to a single phosphate having the formulae (I), (II) or (III):

(i) either a mixture of two or more than two phosphates having the formulae (I), (II) or (III);

(ii) or a mixture of one or more phosphate(s) of formula (I) with one or more phosphate(s) of formula (II) or with one or more phosphate(s) of formula (III);

(iii) or a mixture of one or more phosphate(s) of formula (I) with one or more phosphate(s) of formula (II) and with one or more phosphate(s) of formula (III).

The corresponding amounts of each phosphate in their optional mixtures are not critical and can vary over wide limits.

As mentioned above, the phosphorus-based compound "substantially comprises" an esterified orthophosphoric acid having the formulae (I), (II) and (III). The expression "substantially" is intended to connote that the phosphate(s) employed may optionally contain small amounts of other phosphorus compounds derived from their manufacturing environment, such as, for example, orthophosphoric acid; in this eventuality, the phosphate(s) of formulae (I), (II) and (III) typically represent at least 80 molar percent relative to the total amount of the phosphorus compounds incorporated.

In a highly preferred embodiment of the present invention, a mixture of phosphates is used comprising: a monoalkyl phosphate (I) containing from 1 to 3 carbon atoms, the corresponding diester (II) and the corresponding triester (III).

The amount of phosphorus-based compound(s) employed may vary over wide limits. Advantageously, this amount, expressed as a weight percentage of elementary phosphorus relative to the weight of the polyester pair, ranges from 0.005% to 1% and, preferably, from 0.015% to 0.1%.

The pairs of thermoplastic polyesters, or couples, according to the present invention include a first type of pairs containing 5% to 95% by weight of a first constituent consisting of polyethylene terephthalate, or its copolyester containing at least 80 molar percent of ethylene terephthalate recurring units, and 95% to 5% by weight of a second constituent consisting of poly-1,4-butylene terephthalate or its copolyester containing at least 80 molar percent of butylene terephthalate recurring units.

The preferred comonomers used for the formation of polyethylene terephthalate copolyesters or poly-1,4-butylene terephthalate copolyesters are acids such as isophthalic acid, adipic acid, sebacic acid, trimesic acid, diols such as ethylene glycol (in the case of poly-1,4-butylene terephthalate), 1,4-butanediol (in the case of polyethylene terephthalate), 1,3-propanediol, 1,4-cyclohexanedimethanol, and triols such as glycerol and trimethylolpropane.

In another preferred embodiment, the pairs of the first type contain 5% to 70% by weight and, preferably, 10% to 50% of the first constituent and 95% to 30% by weight and, preferably, 90% to 50% of the second constituent.

The thermoplastic polyesters comprising the pairs of the first type typically have a viscosity number above 500 and, preferably, from 600 to 1,300. The viscosity number is measured at 25° C. using a 1% by weight solution of the polyester in orthochlorophenol. The viscosity number is equal to 1,000 times the reduced viscosity which is itself equal to the ratio of the specific viscosity over the concentration.

The pairs of polyesters according to the invention include a second type of pairs containing 5% to 95% by weight of a first constituent consisting of polyethylene terephthalate or its copolyester containing at least 80 molar percent of ethylene terephthalate recurring units and 95% to 5% by weight of a second constituent consisting of:

(1) a wholly aromatic polyester prepared from:

(i) a bisphenol of formula (IV) or a functional derivative of a bisphenol of this type capable of forming ester concatenations:

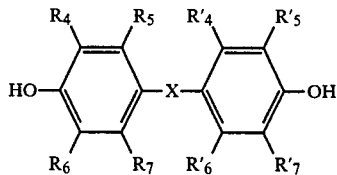

(IV)

in which the symbol X is selected from among —O—; —S—; —SO₂—; —SO—; —CO—; the alkylene and alkylidene groups containing from 1 to 4 carbon atoms;

the group 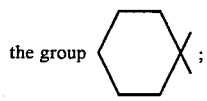;

and the radicals R₄, R₅, R₆, R₇, R′₄, R′₅, R′₆ and R′₇ are selected from among hydrogen, chlorine and bromine atoms and alkyl radicals containing from 1 to 4 carbon atoms; and (ii) an aromatic dicarboxylic acid of the formula (V) or a functional derivative of a dicarboxylic acid of this type capable of forming ester concatenations:

$$HOOC—A_r—COOH \qquad (V)$$

in which the symbol $A_r$ denotes:

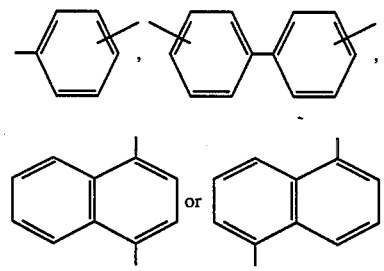

each benzene nucleus being capable of being substituted by an alkyl radical containing from 1 to 3 carbon atoms; or (2) a copolyester of (1) obtained by reacting a mixture of dicarboxylic acids of formula (V) with the bisphenol of formula (IV). For further details of these wholly aromatic polyesters and processes for their preparation, reference is made to French patent applications Nos. 73/23,798 and 79/15,464, published under Nos. 2,190,873 and 2,428,662.

In another preferred embodiment, the pairs of the second type contain 40% to 95% by weight and, preferably, 50% to 90% of the first constituent and 60% to 5% by weight and, preferably, 50% to 10% of the second constituent in a wholly aromatic copolyester prepared from bisphenol A and a mixture of 30 to 70 molar percent of terephthalic acid or functional derivative thereof and 70 to 30 molar percent of isophthalic acid or functional derivative thereof.

The polyethylene terephthalate or its copolyester employed in the pairs of the second type has a viscosity number such as defined above in respect of the pairs of the first type. When wholly aromatic polyesters are involved, these generally have a viscosity number above 500 and, preferably, from 600 to 1,200.

The polyester pairs of the invention may also comprise a third type of pairs containing 5% to 95% by weight of a first constituent consisting of poly-1,4-butylene terephthalate or its copolyester containing at least 80 molar percent of butylene terephthalate recurring units and 95% to 5% by weight of a second constituent consisting of a wholly aromatic polyester (i) or its copolyester (ii) such as defined above in respect of the pairs of the second type.

In still another preferred embodiment, the pairs of the third type contain 40% to 95% by weight and, preferably, 50% to 90% of the first constituent and 60% to 5% by weight and, preferably, 50% to 10% of the second constituent consisting of a wholly aromatic copolyester prepared from bisphenol A and a mixture of 30 to 70 molar percent of terephthalic acid or functional derivative thereof and 70 to 30 molar percent of isophthalic acid or functional derivative thereof.

The viscosity numbers of the polyesters in these pairs of the third type are those noted above in respect of the pairs of the first and of the second type.

The polyesters of the polyethylene terephthalate or poly-1,4-butylene terephthalate type, or their copolyesters, which are the constituents of the compositions according to the invention, are preferably prepared from a lower alkyl ester of terephthalic acid and in particular from dimethyl terephthalate. An ester interchange is carried out between this ester and the diol, optionally in the presence of another comonomer, and the product obtained is then subjected to a polycondensation. The interchange and polycondensation reactions are carried out in accordance with procedures and in the presence of catalysts which are per se known to this art.

The compositions according to the present invention may contain, other than the thermoplastic polyesters and the phosphorus-based compound(s), a nucleating agent and/or a plasticizer and/or at least one filling or reinforcing charge and/or a flame-retardant.

The nucleating agent may be any one of the compounds known for this purpose in the prior art. It is preferably selected from among the metal salts derived from organophosphonic, organophosphinic and organophosphonous acids. Reference is made to French application filed under No. 81/05,797, published under No. 2,502,162, for a more detailed description of this type of material. The amounts of nucleating agent generally range from 0.05% to 10% by weight relative to the pair of thermoplastic polyesters.

The plasticizer which can be employed may be any one of the compounds, also known for this purpose in the prior art. It is preferably selected from β-diketones containing from 14 to 43 carbon atoms, epoxidized vegetable oils, epoxidized esters derived from oleic acid or from tall oil fatty acids, and EMPOL acid esters. Here too, reference is made to the immediately above-mentioned French application for further details on this type of material. The amounts of plasticizer generally range from 1.5% to 15% by weight relative to the pair of thermoplastic polyesters.

The filling or reinforcing charges which may be employed are very diverse. The material in question may be a fibrous substance such as: asbestos fibers; carbon fibers; fibers of the carbide or nitride of a metal or metalloid, such as silicon carbide, silicon nitride or boron carbide fibers; organic fibers capable of withstanding heat; and, preferably, glass fibers. These glass fibers may be ordinary glass fibers or glass fibers sized with a polymeric product and optionally treated, for example, with the aid of a silane. In general, the fibers employed have a diameter which ranges from 3 to 30 μm and a length below 10 mm. The charge may also consist of, especially, ballotini and stratified charges such as mica flakes, or talc. The proportions of charge(s) may reach 100% by weight of the pair of thermoplastic polyesters; they preferably range from 20% to 60%.

The flame-retardants which can be employed include, particularly, red phosphorus and halogenated monomeric organic compounds such as, for example, tetrafluorophthalic or tetrabromophthalic anhydride, bis-(di- or pentabromophenyl) oxide, hexachlorobiphenyl, decabromobiphenyl, dechlorane (condensate of 1 mole of cyclooctadiene with 2 moles of hexachlorocyclopentadiene), these halogenated organic compounds being optionally combined with compounds having a synergistic effect thereon such as antimony trioxide. Also suitable as flame-retardants are polymeric compounds such as particularly brominated polystyrenes and brominated polycarbonates. The amounts of flame-retardant generally range from 5% to 25% by weight relative to the pair of thermoplastic polyesters.

Other additives, such as in particular colorants and stabilizers against the effects of light, oxygen and heat, may also be employed.

The formulation of the compositions according to the invention may be carried out in various manners. The thermoplastic polyesters, the phosphorus-based compound(s) and optionally the intended additive(s) may be mixed directly by transferring all such ingredients through a single- or multi-screw extruder heated to a temperature on the order of 200° C. to 300° C. Preferably, the mixture of the various ingredients is produced by first operating at ambient temperature (20° C.) in a conventional blender, and then by homogenizing all of same in a single- or multiscrew extruder heated to the above-mentioned temperature. It should be noted that the phosphorus-based compound(s) may be added to the compositions of the invention either in the physical state in which they exist naturally, or in the form of a solution in a suitable solvent, preferably having a low melting point. Upon completion of these treatments, the compositions of the invention exit the extruder body in the form of rods which are then granulated; these granulates will subsequently be employed, for example, to fabricate the required articles by the use of conventional equipment for injection molding, transfer molding or extrusion.

These compositions can be molded under the usual conditions, namely, at mold temperatures of from 10° C. to 150° C., at melt temperatures of from 200° C. to 320° C. and at a transfer pressure on the order of 1 Mpa to a few hundred Mpa. The articles produced demold without problems and at high molding rates. The length of the molding cycle may be well below 20 seconds.

The polyester pairs present in the compositions according to the present invention are found to avoid transesterification to a significant degree both during the preparation thereof or during subsequent molding of said compositions.

A convenient method of determining whether the polyester constituents have retained their original identity during the preparation of the compositions of the invention consists of carrying out a differential thermal analysis ("DTA"). For example, in the case of the pair, polyethylene terephthalate+poly-1,4-butylene terephthalate, it has been found that the composition obtained generally continues to show two melting points, one at approximately 225° C. for poly-1,4-butylene terephthalate, the other at approximately 255° C. for polyethylene terephthalate. The precise temperature of each melting point varies with the respective proportions of the polyesters. The stability of the composition has furthermore been confirmed by the observation that the temperatures of at least one of the two melting points remain constant for at least one hour at 280° C. As a result of this virtual absence of transesterification, not only will the compositions of the invention, once molded, be capable of exhibiting improved mechanical and thermal properties in relation to the same compositions in which the transesterification reaction is not hindered or blocked, but also, since the polyester components do not undergo a significant alteration in their structures, it is now possible to recycle, in a second conversion, the polymer scrap produced in a first conversion. Moreover, it is also possible to obtain the same mechanical and thermal properties whatever the residence time of the compositions in the barrel of an extruder.

In order to further illustrate the present invention and the advantages thereof, the following specific examples are given, it being understood that same are intended only as illustrative and in nowise limitative.

EXAMPLE 1

A mixture of monoethyl dihydrogen phosphate (45 molar percent), diethyl monohydrogen phosphate (42 molar percent) and triethyl phosphate (13 molar percent), in an amount determined to provide 0.09% of elementary phosphorus relative to the total weight of the polyesters, was distributed in a combined polycondensate granulate consisting of 70% by weight of polyethylene terephthalate (viscosity number 800) and 30% by weight of poly-1, 4-butylene terephthalate (viscosity number 1,200). This distribution was carried out by first dissolving the phosphorus-based compounds in 1,000 cm$^3$ of acetone and then agitating the polycondensate granules with the solution obtained, the operation being carried out in a rotary evaporator. The solvent employed was then evaporated off at a low temperature on the order of 55° to 60° C.

The material obtained in this manner was charged into a single-screw Thoret extruder having a screw diameter D of 20 mm and a length of 20 D and extrusion was carried out under the conditions reported below:

(i) Temperature of the heating zones: feed: 270° C.; melting zone: 280° C.; compression zone: 275° C.; die: 280° C.;

(ii) Exit pressure (back pressure): 10 Mpa;

(iii) Speed of screw rotation: 55 revolutions/min; and (iv) Throughput of material: 40 g/min.

At the die exit, the product collected in the form of a rod was cooled by passing same through a cold water bath and it was then granulated and dried.

The degree of transesterification in the material obtained in this manner was examined by differential thermal analysis; more particularly, the melting temperature ($T_m$) of the polyethylene terephthalate present in the molding material was measured ($T_m$ is the temperature at the top of the melting peak at a heating rate of 10° C./min). Even a partial transesterification will produce a very marked reduction in $T_m$. A temperature measurement was carried out immediately after the granulation/drying stage and a second measurement was carried out after 1 hour of heat treatment at 280° C. The results obtained are reported in the following table.

As a comparative test (test A), the same operations as those described above were reproduced, but without using a phosphorus-based compound. The results of these measurements of $T_m$ are also reported in the following table.

EXAMPLE 2

The procedure of Example 1 was repeated, but with the use of an amount of phosphorus-based compounds which provided 0.017% of elementary phosphorus relative to the total weight of the polyesters. The results of the measurements of $T_m$ are also reported in the following table.

TABLE

| Example/test | $T_m$ initial | $T_m$ after 1 hr at 280° C. | Transesterification |
| --- | --- | --- | --- |
| 1 | 257° C. | 255° C. | no |
| A | 257° C. | 221° C. | yes |
| 2 | 257° C. | 256° C. | no |

While this invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An improved mixed polyester molding composition, stabilized against transesterification comprising (i) at least two separate thermoplastic polyesters wherein said at least two polyesters comprise (1) from 5% to 95% by weight of polyethylene terephthalate or copolyester thereof which comprises at least 80 molar percent of recurring ethylene terephthalate units, and (2) from 95% to 5% by weight of a poly-1,4-butylene terephthalate or copolyester thereof which comprises at least 80 molar percent of recurring butylene terephthalate unit, and (ii) an amount effective to essentially inhibit transesterification between said at least two polyesters (i) of at least one phosphorus-based compound comprising from 0.015 to 0.1% by weight, expressed as percentage by weight of elementary phosphorus of the weight of said at least two polyesters (1), which substantially comprises an esterified orthophosphoric acid having the formulae (I), (II) or (III):

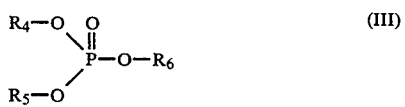

in which $R_1$, $R_2$ and $R_3$, which may be identical or different, are each a straight or branched chain alkyl radical containing from 1 to 8 carbon stoms; a phenyl radical optionally substituted by 1 to 3 alkyl radicals containing from 1 to 3 carbon atoms, a phenylalkyl radical containing from 1 to 3 carbon atoms in the alkyl moiety and the benzene nucleus of which can optionally be substituted by 1 to 3 alkyl radicals having from 1 to 3 carbon atoms, and $R_4$, $R_5$ and $R_6$, which also may be identical or different, are each a straight or branched chain alkyl radical containing from 1 to 4 carbon atoms which can itself be identical to or different from the alkyl radicals $R_1$, $R_2$ and $R_3$.

2. The molding composition as defined by claim 1, said at least one phosphorus-based compound (ii) comprising from 0.015% to 0.1% by weight of the weight of said at least two polyesters (i).

3. The molding composition as defined by claim 1, further comprising at least one nucleating agent, filler, plasticizer, reinforcing agent, flame-retardant, stabilizer, or mixture thereof.

4. A molded shaped article comprising the molding composition as defined by claim 1.

* * * * *